(12) United States Patent
Yokoyama

(10) Patent No.: US 11,752,565 B2
(45) Date of Patent: Sep. 12, 2023

(54) POWER SOURCE DEVICE FOR ELECTRIC DISCHARGE MACHINE

(71) Applicant: MAKINO MILLING MACHINE CO., LTD., Tokyo (JP)

(72) Inventor: Naoto Yokoyama, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 228 days.

(21) Appl. No.: 17/290,467

(22) PCT Filed: Oct. 31, 2018

(86) PCT No.: PCT/JP2018/040621
§ 371 (c)(1),
(2) Date: Apr. 30, 2021

(87) PCT Pub. No.: WO2020/090070
PCT Pub. Date: May 7, 2020

(65) Prior Publication Data
US 2021/0370424 A1 Dec. 2, 2021

(51) Int. Cl.
*B23H 1/02* (2006.01)
(52) U.S. Cl.
CPC ......... *B23H 1/022* (2013.01); *B23H 2300/20* (2013.01)
(58) Field of Classification Search
CPC ................................................ B23H 2300/20
See application file for complete search history.

(56) References Cited

U.S. PATENT DOCUMENTS 3,604,885 A * 9/1971 Inoue ..................... B23H 1/024
219/69.18

FOREIGN PATENT DOCUMENTS

JP          H7-116923 A      5/1995

* cited by examiner

*Primary Examiner* — Geoffrey S Evans
(74) *Attorney, Agent, or Firm* — MORRISON & FOERSTER LLP

(57) ABSTRACT

A power supply device for an electric discharge machine includes a current supply unit for supplying a pulsed current to an electrode gap and a current regeneration unit for regenerating the current. The current supply unit includes a DC power supply, a first switching element, and a second switching element. The current regeneration unit includes a capacitor arranged between a first connection point between an electrode and the first switching element and a second connection point between a workpiece and the second switching element, and a third switching element which is arranged between a third connection point between the first connection point and the DC power supply and a fourth connection point between the second connection point and the capacitor and which is turned on from the start of current regeneration until the current value reaches zero, whereby regeneration current fall time is reduced.

4 Claims, 2 Drawing Sheets

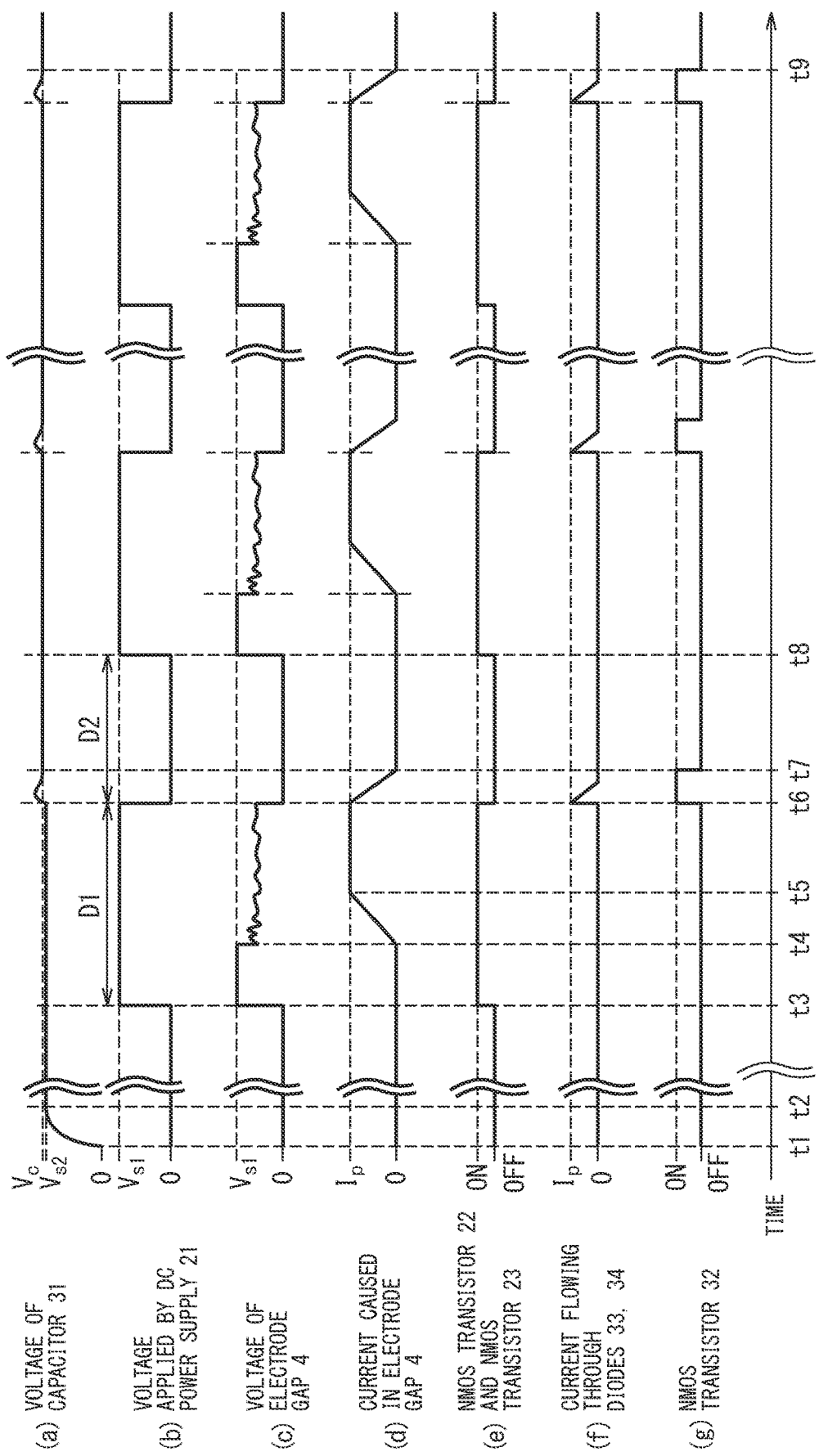

POWER SOURCE DEVICE FOR ELECTRIC DISCHARGE MACHINE

CROSS-REFERENCE TO RELATED APPLICATIONS

This application is a U.S. national stage application under 35 USC 371 of International Patent Application No. PCT/JP2018/040621 filed Oct. 31, 2018, the entire contents of which is incorporated herein by reference.

FIELD OF THE DISCLOSURE

The present invention relates to a power supply device for an electric discharge machine.

BACKGROUND OF THE DISCLOSURE

In electric discharge machines in which a workpiece is subjected to electric discharge machining (for example, die-sinking electric discharge machining), a power supply device in which a pulsed current is supplied to an electrode gap composed of a workpiece and an electrode which are opposed to each other with a predetermined gap is used. The machining time of a workpiece which is machined by an electric discharge machine is determined in accordance with the current supply time from the rise of the current to the start of the fall of the current, the current fall time from the start of the fall of the current to a current value of zero, and the current pause time from the time when the current value becomes zero after the current falls to the time when the current begins rising again. Conventionally, in order to shorten workpiece machining time, a power supply device of an electric discharge machine which regenerates the current so as to make the current fall time as short as possible has been proposed (for example, Patent Literature 1).

When current is regenerated in a power supply device for an electric discharge machine, a current supply path is formed by the electrode gap, a DC power supply connected in parallel to the electrode gap, a switch arranged between the DC power supply and the electrode gap, and a cable arranged between the switch and the electrode gap, and the current regeneration path can be formed by the electrode gap, a regeneration resistor connected in parallel to the electrode gap to consume energy, and a cable arranged between the regeneration resistor and the electrode gap.

In this case, the switch is controlled so as to be turned on and off in accordance with set workpiece machining conditions, and if dielectric breakdown occurs in the electrode gap while the switch is turned on, current will flow through the current supply path, and as soon as the switch is switched off, the current begins falling and current is regenerated through the current regeneration path during the current fall time.

When the value of the current to be regenerated through the current regeneration path (hereinafter "regeneration current") is $I_r$, the peak current value of the current flowing through the current supply path is $I_P$, the value of the regeneration resistor is $R_r$, the inductance value of the cable is $L_c$, and the elapsed time since the fall of current started is $t$, the regeneration current $I_r$ exponentially decreases as represented by the following formula:

$$I_r = I_P \times \left(1 - e^{-\frac{R_r}{L_c}t}\right) \quad \text{[Math 1]}$$

As a result, the current fall time changes in accordance with resistance and the state of the electrode gap, etc.

PATENT LITERATURE

PTL 1 Japanese Unexamined Patent Publication (Kokai) No. 07-116923

BRIEF SUMMARY OF THE DISCLOSURE

When a current regeneration path including a regeneration resistor for regenerating current is formed in a power supply device for an electric discharge machine, since the current decreases exponentially during the current fall time as described above, it becomes difficult to reduce the current fall time, and as a result, it becomes difficult to shorten the workpiece machining time.

Furthermore, if current decreases exponentially during the current fall time as described above, the current fall time becomes shorter as the resistance value of the regeneration resistor increases. However, if the resistance value of the regeneration resistor is increased in order to shorten the current fall time, there is a disadvantage in that the amount of heat generated while the regeneration current flows through the current regeneration path increases in proportion to the resistance value of the resistor circuit.

Though the workpiece machining time can be shortened by shortening the current pause time to the greatest extent possible, if there is insufficient current pause time, there is a risk that workpiece machining accuracy will decrease when the current rises again before the current value becomes zero after the start of the current fall.

The object of the present invention is to provide a power supply device for an electric discharge machine which can shorten workpiece machining time by rapidly reducing the current without increasing heat and lowering workpiece machining accuracy.

The power supply device for an electric discharge machine according to the present invention comprises a current supply unit for supplying a pulsed current to an electrode gap constituted by a workpiece and an electrode, which are opposed to each other with a predetermined gap, for electric-discharge machining a workpiece, and a current regeneration unit for regenerating the current, wherein the current supply unit comprises a first DC power supply which applies a first voltage for generating the current to the electrode gap and which is connected in parallel with the electrode gap, a first switching element which is arranged between the electrode and a side of a first pole of the first DC power supply and which is turned on while the first voltage is being applied to the electrode gap, and a second switching element which is arranged between the workpiece and a side of a second pole of the first DC power supply and which is turned on while the first voltage is being applied to the electrode gap, and the current regeneration unit comprises a capacitive element which is arranged between a first connection point between the electrode and the first switching element and a second connection point between the workpiece and the second switching element, and a third switching element which is arranged between a third connection point between the first connection point and a first side of the first DC power supply and a fourth connection point between the second connection point and one side of the capacitive element and which is turned on when the voltage of the capacitive element exceeds a preset second voltage which is higher than the first voltage during regeneration of the current so as to maintain the voltage of the capacitive element at the second voltage.

According to the present invention, from the start of current regeneration until the current value reaches zero, i.e., while the regeneration current flows through the current regeneration path including the current regeneration unit and electrode gap, the voltage of the capacitive element is maintained at the second voltage, which is higher than the first voltage applied to the electrode gap by the first DC power supply to generate the current. This causes current to decrease linearly in proportion to the second voltage during the current fall time. Therefore, the current fall time corresponding to the current regeneration time can be shortened as compared to the case in which the current falls exponentially during the current fall time using the regeneration resistor, and as a result, the workpiece machining time can be shortened.

Furthermore, according to the present invention, since a regeneration resistor is not used, no heat is generated by the regeneration resistor while the regeneration current flows through the current regeneration unit. Therefore, heat during the current fall time can be reduced as compared to the case in which a regeneration resistor is used. Further, since the regenerated current is returned to the machining power supply side, energy efficiency is suitable.

Further, according to the present invention, since the current fall time can be shortened as compared with the case in which a regeneration resistor is used and the current falls exponentially during the current fall time, the workpiece machining time can be shortened while ensuring sufficient current pause time. Therefore, there is no decrease in workpiece machining accuracy caused by the inability to secure a sufficient current pause time.

Preferably, the power supply device for an electric discharge machine according to the present invention preferably further comprises a second DC power supply connected in parallel to the capacitive element for applying a third voltage having a magnitude between the first voltage and the second voltage to the capacitive element. As a result, from the start of current regeneration until the current value reaches zero, i.e., while the regeneration current flows through the current regeneration path including the current regeneration unit and electrode gap, the voltage of the capacitive element can easily reach the second voltage, which is higher than the first voltage applied to the electrode gap by the first DC power supply to generate the current.

It is preferable that the current regeneration unit further comprise at least one of a first rectifier element having the first pole connected to one side of the capacitive element and the second pole connected to the second connection point and a second rectifier element having the first pole connected to the first connection point and the second pole connected to the other side of the capacitive element. As a result, at least one of supply from the current regeneration unit to the electrode gap and supply from the electrode gap to the current regeneration unit of the regeneration current can suitably be performed.

Preferably, the power supply device for an electric discharge machine according to the present invention further comprises an inductive element arranged between the electrode and the first switching element. As a result, the current ripples can be reduced while shortening the workpiece machining time.

BRIEF DESCRIPTION OF THE FIGURES

FIG. 2 is a timing chart for detailing the operation of the power supply device for an electric discharge machine of FIG. 1.

DETAILED DESCRIPTION OF THE DISCLOSURE

Figure 1:
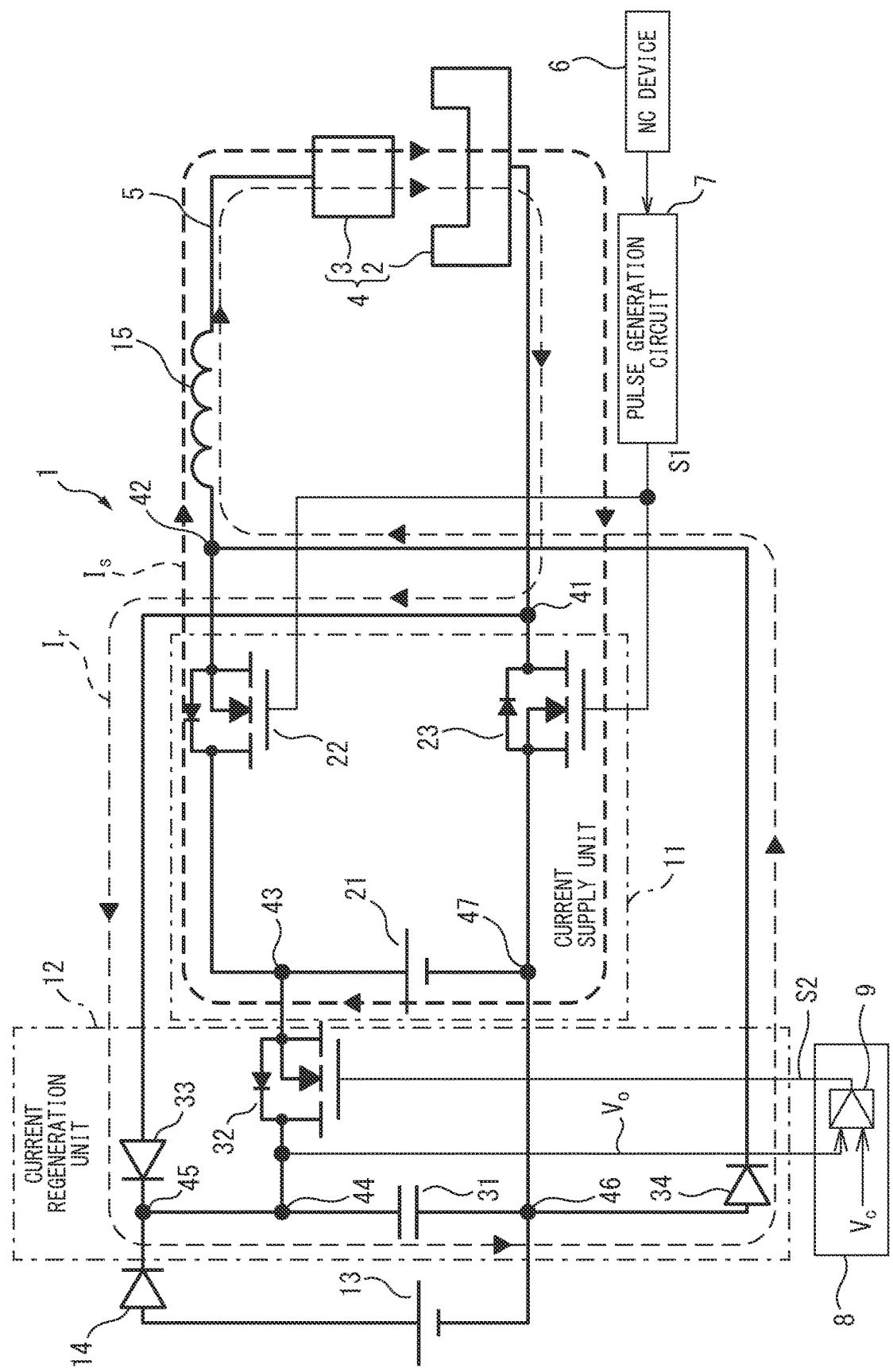
FIG. 1 is a view showing a circuit of a power supply device for an electric discharge machine according to an embodiment of the present invention.

The embodiments of the power supply device for an electric discharge machine according to the present invention will be described in detail below while referring to the drawings.

FIG. 1 is a view showing a circuit of a power supply device for an electric discharge machine according to an embodiment of the present invention. In FIG. 1, the power supply device 1 for an electric discharge machine comprises a current supply unit 11 which supplies pulsed current through a cable 5 to an electrode gap 4 constituted by a workpiece 2 and an electrode 3, which are opposed to each other with a predetermined gap, for electric-discharge machining of the workpiece 2, which is immersed in an electric-discharge machining solution in a machining tank (neither illustrated), and a current regeneration unit 12 for regenerating the current.

The current supply unit 11 comprises a DC power supply 21, an NMOS transistor 22, and an NMOS transistor 23.

The DC power supply 21 is connected in parallel to the electrode gap 4 in order to apply a voltage $V_{s1}$ for generating the current to the electrode gap 4. The DC power supply 21 is an example of a first DC power supply. The pulsed voltage $V_{s1}$ applied to the electrode gap 4 is an example of a first voltage, is, for example, 75 to 160 V, and has a frequency of approximately 1 KHz to several tens of KHz.

The NMOS transistor 22 is arranged between the electrode 3 and the positive side of the DC power supply 21. The NMOS transistor 23 is arranged between the workpiece 2 and the negative side of the DC power supply 21. The NMOS transistor 22 is an example of a first switching element. The NMOS transistor 23 is an example of a second switching element. The positive side of the DC power supply 21 is an example of a first pole side of the first DC power supply. The negative side of the DC power supply 21 is an example of a second pole side of the first DC power supply.

The NMOS transistor 22 and the NMOS transistor 23 are turned on while the DC power supply 21 applies the voltage $V_{s1}$ to the electrode gap 4 based on a pulse signal S1 for turning on and off the NMOS transistor 22 and the NMOS transistor 23. The pulse signal S1 is generated by a pulse generation circuit 7 based on pulse generation conditions corresponding to machining conditions of the workpiece 2 set by the NC device 6 automatically or by the operator. The workpiece 2 machining condition settings are determined in relation to the material of the workpiece 2, the material of the electrode 3, the machining shape of the workpiece 2, etc. The pulse generation conditions include the pulse on/off time of the pulse wave, the number of pulses of the pulse wave, the pulse pause time, etc.

The current regeneration unit 12 comprises a capacitor 31, an NMOS transistor 32, a diode 33, and a diode 34.

One side of the capacitor 31 is connected to a cathode of the diode 33, and a an anode of the diode 33 is connected to a connection point 41 between the workpiece 2 and the NMOS transistor 23. The other side of the capacitor 31 is connected to an anode of the diode 34, and a cathode of the diode 34 is connected to a connection point 42 between the electrode 3 and the NMOS transistor 22. The capacitor 31 is an example of a capacitive element. The diode 33 is an example of a first rectifier element. The diode 34 is an example of a second rectifier element. The cathode of the diode 33 is an example of a first pole of the first rectifier element. The anode of the diode 33 is an example of a second pole of the first rectifier element. The cathode of the diode 34 is an example of a first pole of the second rectifier element. The anode of the diode 34 is an example of a second pole of the second rectifier element. The connection point 42 is an example of a first connection point. The connection point 41 is an example of a second connection point.

The NMOS transistor 32 is arranged between a connection point 43 between the connection point 42 and the positive side of the DC power supply 21 and a connection point 44 between the connection point 41 and one side of the capacitor 31. The NMOS transistor 32 is an example of a third switching element. The connection point 43 is an example of a third connection point. The connection point 44 is an example of a fourth connection point.

In the present embodiment, the NMOS transistor 32 is turned on in the time during which the voltage $V_o$ of the capacitor 31 exceeds the voltage $V_c$ within the current fall time in order to maintain the voltage $V_o$ of the capacitor 31 at a preset voltage $V_c$, which is higher than the voltage $V_{s1}$, based on a pulse signal S2 for turning on and off the NMOS transistor 32. The voltage $V_c$ is an example of a second voltage. The pulse signal S2 is generated by a pulse generation circuit 8 based on results of a comparison between the voltage $V_o$ of the capacitor 31 and the voltage $V_c$ by a comparison calculator 9.

In the present embodiment, the power supply device 1 for an electric discharge machine further comprises a DC power supply 13, a diode 14, and a coil 15.

The DC power supply 13 is connected in parallel to the capacitor 31 to apply a voltage $V_{s2}$ having a magnitude between the voltage $V_{s1}$ and the voltage $V_c$ to the capacitor 31, and is activated by turning on a switch (not illustrated). The DC power supply 13 is an example of a second DC power supply. The voltage $V_{s2}$ is an example of a third voltage. The positive side of the DC power supply 13 is connected to a connection point 45 through the diode 14, and the negative side of the DC power supply 13 is connected to a connection point 46 between the other side of the capacitor 31 and the anode of the diode 34. Furthermore, the connection point 46 is connected to a connection point 47 between the negative side of the DC power supply 21 and the NMOS transistor 23. The voltage $V_c$ is set to a value slightly higher than the voltage $V_{s2}$. For example, the voltage $V_c$ is set to 1.1-fold of the voltage $V_{s2}$.

The diode 14 is provided for backflow prevention, and has a cathode which is connected to the cathode of the diode 33 and one side of the capacitor 31 and an anode which is connected to the positive side of the DC power supply 13. The coil 15 is arranged between the connection point 42 and the cable 5 to reduce current ripples. The coil 15 is an example of an inductive element.

The current generated as a result of dielectric breakdown which has occurred in the electrode gap 4 while the NMOS transistor 22 and the NMOS transistor 23 are turned on returns to the current supply unit 11 again after flowing from the current supply unit 11 through the coil 15, the cable 5, and the electrode gap 4, as indicated by the dashed line $I_s$.

The current (regeneration current) which is regenerated in the current regeneration unit 12 immediately after the NMOS transistor 22 and the NMOS transistor 23 are switched from on to off until the current value becomes zero returns to the current regeneration unit 12 after flowing through the coil 15, the cable 5, and the electrode gap 4 from the current regeneration unit 12, as indicated by the dashed line $I_r$.

FIG. 2 is a timing chart detailing the operation of the power supply device for an electric discharge machine of FIG. 1. In the timing chart of FIG. 2, the case in which the application of the voltage $V_{s1}$ to the electrode gap 4 by the DC power supply 21 over the period D1 and the stop of the application of the voltage to the electrode gap 4 by the DC power supply 21 over the subsequent period D2 are repeated N times in order to machine the workpiece 2 will be described.

When the DC power supply 13 is started at time t1 before the machining of the workpiece 2 starts in order to perform initial charging of the capacitor 31, the voltage between both ends of the capacitor 31 reaches $V_{s2}$ at time t2.

When the NMOS transistor 22 and the NMOS transistor 23 are switched from off to on in response to the pulse signal S1 at time t3 when the machining of the workpiece 2 is started, voltage $V_{s1}$ is applied to the electrode gap 4 by the DC power supply 21, dielectric breakdown occurs in the electrode gap 4 at time t4, and the current generated by dielectric breakdown reaches the peak current $I_P$, which is the target current value, at time t5. From time t4 when dielectric breakdown occurs in the electrode gap 4 to time t6 corresponding to the end of period D1, the current returns to the current supply unit 11 again after flowing from the current supply unit 11 through the coil 15, the cable 5, and the electrode gap 4 as indicated by the dashed line $I_s$.

At time t6, the NMOS transistor 22 and the NMOS transistor 23 are switched from on to off in response to the pulse signal S1. As a result, the voltage between both ends of the NMOS transistor 23 rises, and when the voltage between both ends of the NMOS transistor 23 exceeds the voltage $V_o$ of the capacitor 31, the regeneration current returns to the current regeneration unit 12 after flowing from the current regeneration unit 12 through the coil 15, the cable 5, and the electrode gap 4, as indicated by the dashed line $I_r$. The regeneration current linearly decreases in proportion to the value obtained by dividing the voltage $V_o$ of the capacitor 31 by the sum of the inductance value of the cable 5 and the inductance value of the coil 15.

Due to the regeneration current, as well as the inductance of the cable 5 and the inductance of the coil 15, the voltage $V_o$ between both ends of the capacitor 31 becomes larger than the voltage $V_c$. To maintain the voltage $V_o$ between both ends of the capacitor 31 at the voltage $V_c$, at time t6, the NMOS transistor 32 switches from off to on in response to the pulse signal S2, and the charge stored in the capacitor 31 discharges to the positive side of the DC power supply 21 through the NMOS transistor 32. As described above, since the voltage $V_c$ is set to a value slightly higher than the voltage $V_{s2}$, the capacity of the DC power supply 13 can be made as small as possible.

At time t7, the current value generated in the electrode gap 4 reaches zero, and the NMOS transistor 32 is switched from on to off in response to the pulse signal S2. In FIG. 2, the time between time t4 and time t6 corresponds to the current supply time, the time between time t6 and time t7 corresponds to the current fall time, and the time between time t7 and time t8 at the end of period D2 corresponds to the current pause time.

From time t8 to time t9, the application of the voltage $V_{s1}$ to the electrode gap 4 by the DC power supply 21 over the period D1, and the stop of the application of the voltage to the electrode gap 4 by the DC power supply 21 over the subsequent period D2 are repeated N−1 times.

According to the present embodiment, from the start of current regeneration until the current value reaches zero, i.e., while the regeneration current flows through the current regeneration path including the current regeneration unit 12, the coil 15, the cable 5 and the electrode gap 4, the voltage of the capacitor 31 is maintained at the voltage $V_c$, which is higher than the voltage $V_{s1}$ applied to the electrode gap 4 by the DC power supply 21 to generate the current. As a result, the current decreases linearly in proportion to the voltage $V_c$ during the current fall time. Therefore, the current fall time corresponding to the current regeneration time can be shortened as compared with the case in which the current falls exponentially during the current fall time using a regeneration resistor, and as a result, the machining time of the workpiece 2 can be shortened.

According to the present embodiment, since a regeneration resistor is not used, heat is not generated by a regeneration resistor while the regeneration current flows through the current regeneration unit 12. Therefore, the amount of heat generated during the current fall time can be reduced as compared with the case in which a regeneration resistor is used. Further, since the regenerated current is returned to the machining power supply side, energy efficiency is suitable.

According to the present embodiment, since the current fall time can be shortened as compared to the case in which the current falls exponentially during the current fall time using a regeneration resistor, the machining time of the workpiece 2 can be shortened while sufficiently securing the current pause time. Therefore, there is no decrease in the machining accuracy of the workpiece 2 caused by the inability to secure a sufficient current pause time.

According to the present embodiment, the DC power supply 13 is provided, and as a result, from the start of current regeneration until the current value reaches zero, i.e., while the regeneration current flows through the current regeneration path including the current regeneration unit 12, the coil 15, the cable 5, and the electrode gap 4, the voltage of the capacitor 31 can easily reach the voltage $V_c$, which is higher than the voltage $V_{s1}$ applied to the electrode gap 4 by the DC power supply 21 to generate a current.

According to the present embodiment, the current regeneration unit 12 comprises the diode 33 and the diode 34, and as a result, supply of the regeneration current from the current regeneration unit 12 to the electrode gap 4 and supply of the regeneration current from the electrode gap 4 to the current regeneration unit 12 can be suitably performed.

According to the present embodiment, the coil 15 is further provided, and as a result, current ripples can be reduced while shortening the machining time of the workpiece 2.

The present invention is not limited to the embodiments described above, and various changes and modifications can be made. For example, at least one of the DC power supply 13, the diode 14, and the coil 15 may be omitted. Furthermore, at least one of the diode 33 and diode 34 of the current regeneration unit 12 may be omitted. Further, a PMOS transistor may be used as the switching element.

REFERENCE SIGNS LIST

1 power supply device of electric discharge machine
2 workpiece
3 electrode
4 electrode gap
5 cables
11 current supply unit
12 current regeneration unit
13,21 DC power supply
14, 33, 34 diode
15 coil
22, 23, 32 NMOS transistor
31 capacitor

The invention claimed is:

1. A power supply device for an electric discharge machine, comprising:
    a current supply unit for supplying a pulsed current to an electrode gap constituted by a workpiece and an electrode, which are opposed to each other with a predetermined gap, for electric-discharge machining a workpiece, and
    a current regeneration unit for regenerating the current, wherein
    the current supply unit comprises:
        a first DC power supply for applying a first voltage which generates the current to the electrode gap and which is connected in parallel with the electrode gap,
        a first switching element which is arranged between the electrode and a side of a first pole of the first DC power supply and which is turned on while the first voltage is being applied to the electrode gap, and
        a second switching element which is arranged between the workpiece and a side of a second pole of the first DC power supply and which is turned on while the first voltage is being applied to the electrode gap, and
    the current regeneration unit comprises:
        a capacitive element which is arranged between a first connection point between the electrode and the first switching element and a second connection point between the workpiece and the second switching element, and
        a third switching element which is arranged between a third connection point between the first connection point and a first side of the first DC power supply and a fourth connection point between the second connection point and one side of the capacitive element and which is turned on when the voltage of the capacitive element exceeds a preset second voltage which is higher than the first voltage during regeneration of the current so as to maintain the voltage of the capacitive element at the second voltage.

2. The power supply device for an electric discharge machine according to claim 1, further comprising a second DC power supply connected in parallel to the capacitive element for applying a third voltage having a magnitude between the first voltage and the second voltage to the capacitive element.

3. The power supply device for an electric discharge machine according to claim 1, wherein the current regeneration unit further comprises at least one of a first rectifier element having a first cathode connected to one side of the capacitive element and a first anode connected to the second connection point and a second rectifier element having a second cathode connected to the first connection point and a second anode connected to the other side of the capacitive element.

4. The power supply device for an electric discharge machine according to claim 1, further comprising an inductive element arranged between the electrode and the first switching element.

* * * * *